April 1, 1924.
D. G. DUTY
1,488,741
AIR BRAKE FOR MOTOR VEHICLES
Filed Jan. 12, 1923  2 Sheets-Sheet 1
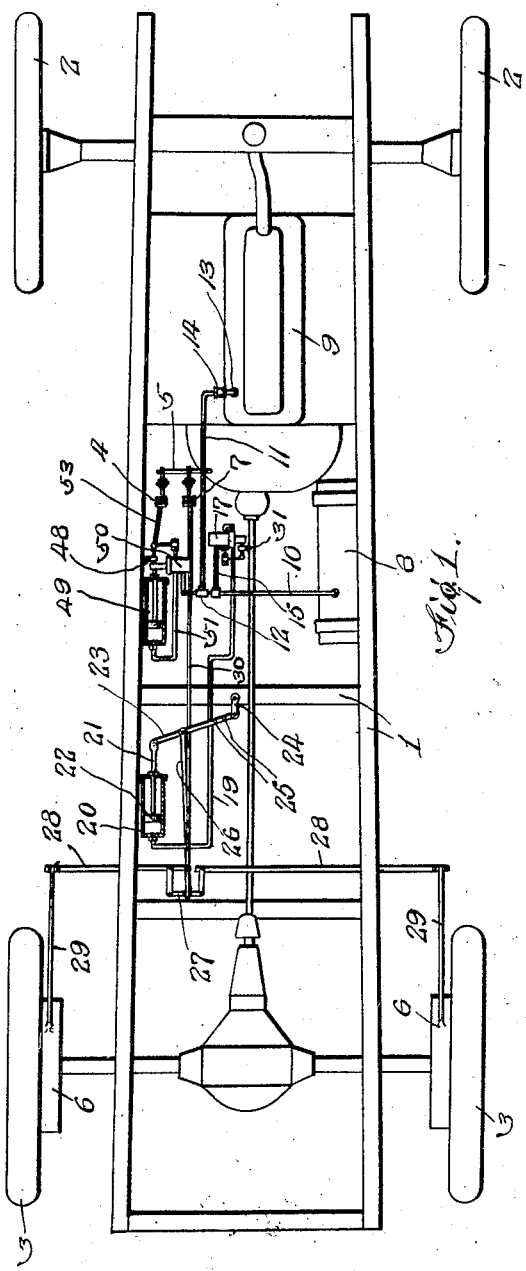
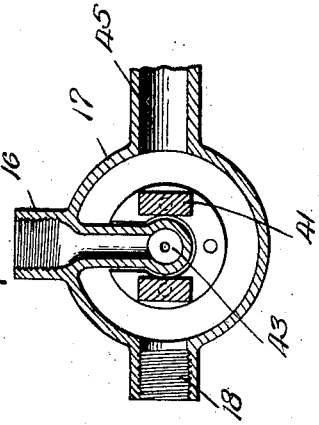
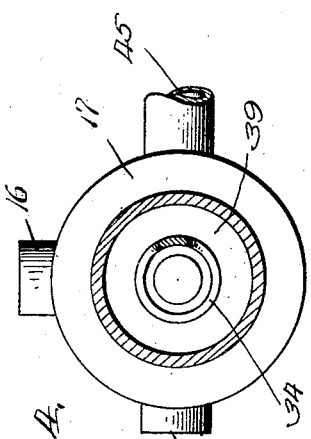
Inventor:
Dorsey G. Duty
By Percy H. Moore
Atty.

April 1, 1924.

D. G. DUTY 1,488,741

AIR BRAKE FOR MOTOR VEHICLES

Filed Jan. 12, 1923    2 Sheets-Sheet 2

Inventor
Dorsey G. Duty
By Percy H. Moore
Atty.

Patented Apr. 1, 1924.

1,488,741

UNITED STATES PATENT OFFICE.

DORSEY G. DUTY, OF PENNSBORO, WEST VIRGINIA.

AIR BRAKE FOR MOTOR VEHICLES.

Application filed January 12, 1923. Serial No. 612,233.

*To all whom it may concern:*

Be it known that DORSEY G. DUTY, a citizen of the United States of America, residing at Pennsboro, in the county of Ritchie and State of West Virginia, has invented certain new and useful Improvements in Air Brakes for Motor Vehicles, of which the following is a specification.

My invention relates to brakes for motor vehicles and more particularly to air brakes for such vehicles.

One of the objects of the invention is to provide simple and easily actuated means for quickly releasing the clutch and applying the brakes without the use of the feet.

Another object of the invention is to provide means whereby the operator can with minimum effort gradually apply the brakes without interfering with the usual foot pedal mechanism.

Other objects and advantages will be in part described and in part obvious as the specification is proceeded with.

In the accompanying drawings forming part of the specification:

Figure 1 is a plan view of an automobile with my invention thereon;

Figure 4 is a section on line 4—4 of Fig. 2; and

Figure 5 is a section on line 5—5 of Figure 2.

Figure 2:
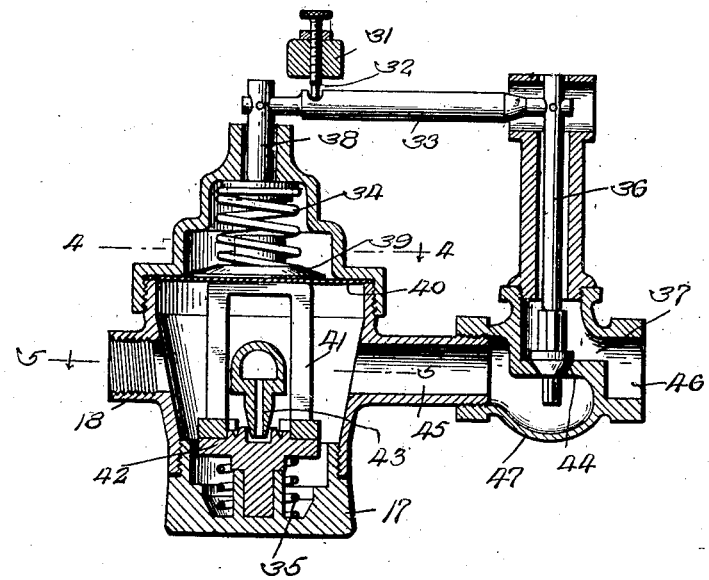
Figure 2 is a horizontal section through the air control member.
Figure 3:
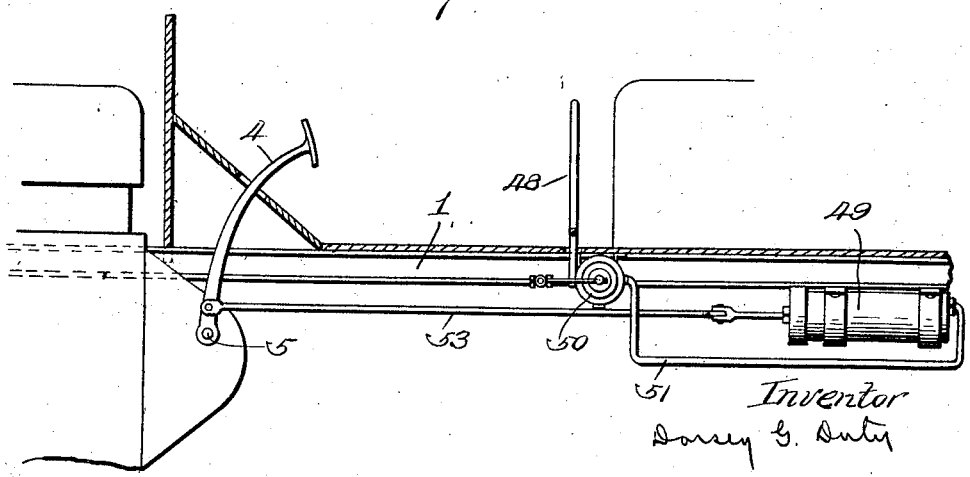
Figure 3 is a partial side elevation of Fig. 1.

Referring more particularly to the drawings, 1 denotes the frame of an automobile supported upon front and rear wheels 2 and 3 respectively. The clutch (not shown) is actuated in the usual way by means of foot pedal 4, fixedly mounted on the clutch shaft 5, while the brakes 6, on the rear wheels 3, are connected up with the foot pedal 7, loosely mounted on the shaft 5. The invention also contemplates the use of compressed air for actuating the brake mechanism and for throwing out the clutch independently of the foot pedals.

A compressed air tank 8, suitably mounted on the frame 1, is connected to the explosion chamber (not shown) of the engine 9, by means of a transverse pipe 10, leading from the tank and connected to one end of a longitudinally disposed pipe 11, by means of a T 12, the pipe 11, being connected at its other end to an elbow 13, in turn communicating with the explosion chamber. The elbow 13, is provided with a suitable check valve 14. When the engine is running compressed air will be constantly forced into the tank 8, in an obvious manner. Of course it is only necessary that the tank 8, be in communication with the explosion chamber of but one cylinder of the engine.

A short longitudinally disposed pipe 15, connects the pipe 10, with the inlet opening 16, of an air pressure control member 17, provided with an outlet 18, through which the compressed air passes into the pipe 19, and thence into one end of the brake control cylinder 20. The piston rod 21, of the piston 22, of the cylinder 20, is pivotally connected to a rock arm 23, which in turn is pivotally connected to the frame 1, by a link 24, the rod 23, being provided with a series of openings 25, whereby the point of connection with the link 24, may be adjusted to obtain the desired leverage. A rod 26, is connected at its forward end to the rod 23, intermediate the ends of the latter and at its rear end is connected to the crank arm 27, of the usual brake rods 28 and 29 of the brake 6.

It will thus be seen that forward movement of the rod 26, rocks the crank arm 27, and the rods 28, in a clockwise direction, thus pulling the rods 29, forwardly and causing the brakes 6, to tighten.

This movement of the rod 26, and consequent application of the brake can be effected through the manipulation of the brake foot pedal 7, and the rod 30, which connects the pedal 7, with the crank 27, or this may be accomplished by admitting compressed air into the cylinder 20, in the following manner.

The operator presses the knee lever 31 to the right, causing the pin 32, on the lower end of the lever to engage the rod 33, which in turn is connected at one end to the valve stem 36, of the blow off valve 37, and at its other end to a pin 38, resting on the spring 34, seated on the plunger 39, of the air pressure control member 17. As the pin 38, is pushed inwardly the plunger 39 and diaphragm 40 move correspondingly and impart inward movement to the spider 41, and valve seat 42, against which the spider bears, moving the latter away from the air inlet nozzle 43, connected to the air inlet opening 16, previously referred to. This permits of the compressed air passing out through the air outlet 18, into the air pipe 19, and thence into the cylinder 20. The piston 22, would thus be actuated and the brakes tightened through the action of the piston rod 21, rock arm 23, connecting rod 26, crank 27 and brake rods 28 and 29. During this operation the blow off valve 37, would be forced tightly closed. It may here be noted that the air pressure can be gradually applied with little effort on the part of the operator, it merely being necessary for the latter to slowly push the knee lever 31, to the limit of its movement to obtain the maximum air pressure. The brakes will thus be gradually and smoothly applied, with little increased effort on the part of the operator as the tension on spring 34, increases toward the end of the movement of the knee lever. This movement of the knee lever also forces the blow off valve 37, to its seat 44, and prevents air escaping through the blow off outlet 45, leading from the air pressure control member 17. When the knee lever 31, is released or relieved of pressure of the operator's knee, the spring 35, moves the valve seat 42, up against the nozzle 43, closing the latter. At the same time this spring 35, lifts the blow off valve 37, from its seat permitting the air to gradually exhaust through the opening 46, in the blow off valve casing 47.

The clutch (not shown) can be operated either by the foot pedal 4, or by means of compressed air as follows: A clutch lever 48, clutch cylinder 49, and pressure control member 50, identical with the brake lever 31, brake cylinder 20 and brake pressure control member 17, respectively, the only difference being that the position of the member 50, is just the reverse of that of the member 17. When the operator pushes the clutch knee lever 48, outwardly by exerting pressure with the left knee the pin 32, on the lower end of the knee lever engages the rod 33, thereby actuating the air control mechanism in the identical manner described in connection with the operation of the brakes. The pipe 10, leading from the air tank 8, connects up with the inlet opening 16, of the member 50, in the same manner as the branch pipe 15, connects with the air pressure control member 17. A pipe 51, connects the outlet opening 18, of the member 50, with the clutch operating cylinder 52. Consequently when the knee lever 48, is actuated the piston of cylinder 52, will be moved forwardly and the clutch shaft 5, will be rocked through the medium of the rod 53, which connects the shaft 5, with the piston of cylinder 52, thereby throwing out the clutch (not shown).

The air pressure control members 17 and 50 are identical therefore it is deemed unnecessary to describe the structure and operation of both in detail. It will be noted that the air pressure control members receive the air from a common source and that the one can be used without the other, or both can be used at the same time, also that one or both of the foot pedals can be used independently of either of the air controls or simultaneously therewith.

Having thus described my invention, what I claim is:

1. The combination of a motor vehicle having wheels and brakes therefor and a clutch, a compressed air tank in communication with the explosion chamber of the engine, foot pedal controls for said clutch and brakes, means for actuating said brakes and clutch by compressed air including separate clutch pressure control and brake pressure control members, and means for supplying air to either one or both of said members from said tank.

2. An air brake system for motor vehicles including a foot controlled clutch and a foot controlled brake, in combination with a source of supply of compressed air, separate air pressure control members having a common connection with said source of compressed air supply, separate communicating means between said air pressure control members and the brake and clutch, and means for independently feeding air in gradually increasing force from one or both of said members to said communicating means, whereby the clutch and brakes may be actuated independently of each other by either foot or compressed air.

3. In combination with a motor driven vehicle having wheels and brakes therefor, and a clutch, foot pedal controls for independently actuating the brakes and clutch, a source of compressed air supply, compressed air actuated means for actuating said brakes and clutch independently of each other and of said foot pedal controls, separate pressure control means for feeding and controlling the feeding of compressed air to said actuating means, and common communicating means between said source of air supply and said pressure control means.

In testimony whereof I affix my signature.

DORSEY G. DUTY.